United States Patent Office 3,457,483
Patented July 22, 1969

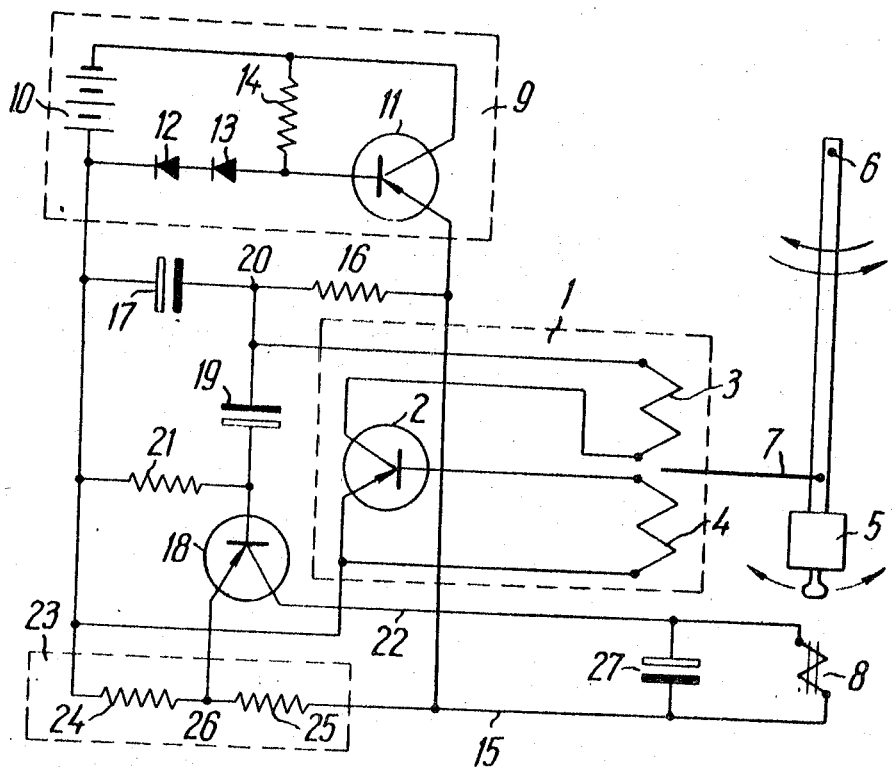

3,457,483
TRANSISTORIZED ELECTROMAGNETIC DRIVE FOR AN ELECTRIC CLOCK
Mark Petrovich Reifman, prospekt Kosmonavtov, 18, korpus 2, kv. 96; Nikolai Nikolaevich Bondarev, ulitsa Tkachei, 50, kv. 32; and Lev Simkhovich Gendelman, ulitsa Gertsena, 46, kv. 19, all of Leningrad, U.S.S.R.
Filed Sept. 18, 1967, Ser. No. 668,613
Int. Cl. G05b 11/02
U.S. Cl. 318—128                           3 Claims

ABSTRACT OF THE DISCLOSURE

A transistorized electromagnetic drive system for an electric clock consisting of an electromagnetically driven pendulum mounting a ferromagnetic coupling plate which serves to couple and uncouple feedback induction coils. The feedback pulses from said coils trigger the pulse generator which energizes the electromagnet.

---

The present invention relates to drive systems for electrically operated time-measuring apparatus, and, more particularly, to transistorized electromagnetic drive means for electric clocks.

A known transistorized electromagnetic drive system for an electric clock comprises a switching circuit employing a transistor and connected to a power supply source, said circuit controlling the drive electromagnet. In this known drive system break induced current is employed for the generation of current pulses, said break induced current having its amplitude stabilized by means of a stabilotron means connected in parallel with the drive electromagnet.

In this known drive system the value of the break induced current depends to a great extent on voltage variations in the power supply source, and when the voltage drops beyond the lowest rated value, the break induced current fails to reach the lowest point of the range of stabilization.

This disadvantage affects the accuracy of the drive system when such low voltage variations occur in the power supply source, and also leads to increased power consumption.

It is, therefore, an object of the present invention to provide a transistorized electromagnetic drive system for an electric clock, which is capable of operation under the conditions of a relatively low voltage in the power supply.

It is another object of the present invention to provide a transistorized electromagnetic drive system for an electric clock, the accuracy of operation of which is virtually unaffected by voltage variations in the power supply source.

It is a specific object of the present invention to provide a transistorized electromagnetic drive system for an electric clock, which comprises an improved current pulse generation circuit ensuring stable operation of the drive system with reduced voltage of the power supply source and being virtually unaffected by voltage variations in the power supply source.

Said and other objects are attained in a transistorized electromagnetic drive system for an electric clock, comprising, in accordance with the present invention, an additional transistor in the circuit of the drive electromagnet, said additional transistor being connected to a source of power, preferably a stabilized one, said additional transistor being adapted to operate under saturation conditions and limited current flowing through its collector connected into the side of the drive electromagnet.

In a preferred embodiment of the present invention the base of said additional transistor is connected through a capacitor to one of the sides of the power supply source and through a resistor—to the other side of this power supply source, the collector of said additional transistor being connected to the drive electromagnet, while the emitter of said additional transistor is connected to a voltage divider in the side connecting the drive electromagnet to the power supply source.

It is also advisable for one of the sides leading to one side of the power supply source to include the collector and emitter of still another transistor of which the base is connected through a resistor to said one side leading to said one side of said power supply source, said base being also connected to the side leading to the other side of said power supply source through two series-connected diodes.

The invention will be better understood from the following description of an embodiment thereof, in which due reference is made to the accompanying drawing showing schematically the circuit diagram of a transistorized electromagnetic drive system for an electric clock, embodying the invention.

The single figure of the drawing depicts a transistorized electromagnetic drive for an electric clock comprises a switching unit 1 employing a transistor 2. The collector circuit of the transistor 2 includes an induction coil 3, while another induction coil 4 is connected between the base and the emitter of the transistor 2. The coils 3 and 4 are axially aligned and also slightly spaced axially in relation to each other, forming a gap therebetween.

A pendulum 5 is suspended from a pivot point 6 adjacent to the induction coils 3 and 4. Horizontally protruding from the pendulum 5 is a rigid plate 7 made of a ferromagnetic material. The spacing between the pendulum and the induction coils, as well as the vertical position of the pendulum are so chosen, that the plate 7 enters the gap between the coils 3 and 4 when the pendulum, while oscillating, moves to its position nearest to the coils, the said plate 7 not coming into physical contact with either one of the coils.

Positioned directly under the pendulum 5 is a drive electromagnet 8 comprising a coil with a core made of a non-retentive material.

The drive system, embodying the present invention, also includes a stabilized power source 9 comprising an electric battery 10 having a negative terminal and a positive terminal. The stabilized power source 9 further comprises a transistor 11 of which the collector is connected to the negative terminal of the battery 10. The base of the transistor 11 is connected to the positive terminal of the same battery 10 through a circuit including two series-connected diodes 12 and 13. The base of the transistor 11 is also connected through a resistor 14 to the negative terminal of the battery 10. The emitter of the transistor 11 is connected to the circuit 15 leading to the drive electromagnet 8 and is also connected to the positive terminal of the battery 10 through a resistor 16 and a capacitor 17, connected in series.

The herein described drive system also includes a transistor 18 of which the base is connected through a capacitor 19 to the induction coil 3 and also to the junction 20 of the resistor 16-capacitor 17 circuit. The base of the transistor 18 is also connected through a resistor 21 to the positive terminal of the battery 10. The collector of the transistor 18 is connected to the circuit 22 leading to the drive electromagnet 8. Connected between the circuit 15 leading to the drive electromagnet 8 and the positive terminal of the battery 10 is a voltage divider 23 comprising two series-connected resistors 24 and 25. The emitter of the transistor 18 is connected to the junction 26 in the voltage divider 23. The capacitor 27 is connected between the circuits 22 and 15 in parallel with the drive electromagnet 8.

The drive system embodying the present invention operates as follows.

When the pendulum 5 is in its vertical position, electric current flows from the emitter of the transistor 11 through the resistor 16, the induction coil 3, the transistor 2, and the induction coil 4 to the positive terminal of the battery 10.

Because of the presence of the induction coils 3 and 4 the transistor 2 is in an excited state and conducts. Simultaneously, the capacitor 19 discharges, while the transistor 18 is non-conductive, and no current flows through the drive electromagnet 8.

When the pendulum swings to the left, the plate 7 enters the gap between the coils 3 and 4, thus reducing the inductive coupling therebetween. Accordingly, the excitation of the transistor 2 decreases till the latter becomes non-conductive, and current ceases flowing therethrough. As a result, the capacitor 19 starts being charged through the resistor 21, whereby potential across the resistor 21 drops. Subsequently, the transistor 18 starts conducting, and electric current starts flowing through its collector to the drive electromagnet 8. An additional positive bias is impressed on the base of the transistor 18 by the connection of voltage divider 23, whereby the whole drive system is protected from failure even with reduced voltage of the power supply source 9, because in this case the current which energizes the drive electromagnet 8 is sufficient for the normal operation of the latter. When current flowing through the transistor 18 reaches the saturation value, a current pulse of a desired duration and amplitude is generated.

In this case the current flowing through drive electromagnet 8 creates a magnetic force which is applied to the pendulum 5 and urges it to the right, i.e. away from the induction coils 3 and 4. With the pendulum 5 swinging to the right, inductive coupling is resumed between the coils 3 and 4, whereby the transistor 2 starts conducting, the capacitor 19 starts to discharge, the transistor 18 becomes non-conducting, and the current flowing through the drive electromagnet 8 ceases.

As is now quite clear for those competent in the art, the duration of the current pulse supplied to the drive electromagnet is a constant value, and, subsequently, the time of energization of the electromagnet 8 is also a constant value.

On the other hand, the constancy of the amplitude and duration of successive current pulses fed to the drive electromagnet 8 ensures that the latter repeatedly applies to the pendulum 5 a biasing force of a constant magnitude, whereby highly regular oscillation cycles of the pendulum 5 are achieved.

The capacitors 27 and 17 are meant to do away with the high-frequency variable component of the current flowing through the circuit of the drive electromagnet 8 at abnormal transients.

What is claimed is:

1. A transistorized electromagnetic drive for an electric clock, comprising: a switching device including a first transistor having a base, an emitter and a collector; a first induction coil in the circuit of said collector of said first transistor; a second induction coil connected between said base and said emitter of said first transistor; and second induction coil being inductively associated with said first induction coil; a movable member made of a ferromagnetic material; said movable member being arranged to be positioned in operation between said first and second induction coils; a pendulum operatively associated with said movable member for moving the same towards and away from said induction coils; an electromagnet capable of actuating said pendulum; electric power supply means for said switching device; and a generator of electric pulses including a second transistor having a base, an emitter and a collector; said second transistor collector being connected into the circuit of said electromagnet and being adapted to operate under a saturation condition and limited current flowing through its collector.

2. A transisitorized electromagnetic drive for an electric clock, comprising: a switching device including a first transistor having a base, an emitter and a collector, a first induction coil in the circuit of said collector of said first transistor; a second induction coil connected between the base and emitter of said first transistor, said second induction coil being inductively associated with said first induction coil; a movable member made of a ferromagnetic material; said movable member being arranged to be positioned in operation between said first and second induction coils; a pendulum operatively associated with said movable member for moving the same towards and away from said induction coils; an electromagnet capable of actuating said pendulum; electric power supply means for said switching device; a generator of electric pulses including a second transistor having its collector connected to said electromagnet; a capacitor connected to the base of said second transistor and also to one side of said power supply means; a resistor connected to the base of said second transistor and also to the other side of said power supply means; a voltage divider including at least two series-connected resistors connected to said power supply means and also connected to said electromagnet and to the emitter of said second transistor.

3. A transistorized electromagnetic drive for an electric clock comprising a switching device including a first transistor having a base, an emitter and a collector, a first induction coil in the circuit of said collector of said first transistor; a second induction coil connected between said base and said emitter of said first transistor, said second induction coil being inductively associated with said first induction coil; a movable member made of a ferromagnetic material; said movable member being arranged to be positioned in operation between said first and second induction coils; a pendulum operatively associated with said movable member for moving the same towards and away from said induction coils; an electromagnet capable of actuating said pendulum; an electric power supply source; a generator of electric pulses including a second transistor having its collector connected to said electromagnet; a third transistor having its collector connected to one side of said power supply source and also having its emitter connected to said electromagnet; at least one diode connected to the other side of said power supply source and to the base of said third transistor in a sense to prevent current flow from said other power supply source side to said base; a resistor connected across the base and the collector of said third transistor; a capacitor connected to the base of said second transistor and to said one side of said power supply source; a second resistor connected to the base of said second transistor and to said other side of said power supply source; and a voltage divider having at least two series-connected resistor means connected to said power supply source and to said electromagnet, the emitter of said second transistor being connected to the junction of said two series-connected resistors.

References Cited

UNITED STATES PATENTS 2,829,324 4/1958 Sargeant _____ 318—128
2,877,399 3/1959 Shaull _____ 318—128
3,134,220 5/1964 Meisner _____ 58—28
3,349,306 10/1967 Buck _____ 318—132 X

FOREIGN PATENTS 172,234 7/1965 U.S.S.R.

MILTON O. HIRSHFIELD, Primary Examiner

D. F. DUGGAN, Assistant Examiner

U.S. Cl. X.R.

58—23; 318—132, 133; 331—116